United States Patent
Wu

(10) Patent No.: US 9,978,338 B2
(45) Date of Patent: May 22, 2018

(54) METHOD AND SYSTEM OF SHOWING COLORS FOR MOSAIC DISPLAY DEVICE

(71) Applicant: Shenzhen China Star Optoelectronics Technology Co., Ltd., Shenzhen, Guangdong (CN)

(72) Inventor: Jinjun Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 112 days.

(21) Appl. No.: 15/108,300

(22) PCT Filed: Apr. 29, 2016

(86) PCT No.: PCT/CN2016/080809
§ 371 (c)(1),
(2) Date: Jun. 25, 2016

(87) PCT Pub. No.: WO2017/133091
PCT Pub. Date: Aug. 10, 2017

(65) Prior Publication Data
US 2018/0040294 A1   Feb. 8, 2018

(30) Foreign Application Priority Data

Feb. 1, 2016 (CN) .......................... 2016 1 0069439

(51) Int. Cl.
*G09G 5/02* (2006.01)
*G02F 1/1335* (2006.01)
(Continued)

(52) U.S. Cl.
CPC ............. *G09G 5/02* (2013.01); *G02F 1/1336* (2013.01); *G09G 3/3406* (2013.01); *G09G 3/3611* (2013.01)

(58) Field of Classification Search
CPC ... G09G 2320/0693; G09G 2320/0666; G09G 2300/026; G06F 3/1446
See application file for complete search history.

(56) References Cited

U.S. PATENT DOCUMENTS 5,561,459 A * 10/1996 Stokes ..................... G09G 5/02
345/904
6,243,059 B1    6/2001 Greene et al.
(Continued)

FOREIGN PATENT DOCUMENTS

CN          102097082 A      6/2011
CN          102509541 A      6/2012
(Continued)

*Primary Examiner* — Koosha Sharifi-Tafreshi
(74) *Attorney, Agent, or Firm* — Andrew C. Cheng

(57) ABSTRACT

The present invention discloses a method and a system of showing colors for a mosaic display device, in which sending the reference control signal to the first LCD to control the first pixel unit in the first LCD to show the reference colors; determining the reference three stimulus values of the reference colors; determining the calibration three stimulus values closest to the reference three stimulus values; and then sending the calibration control signal to the second LCD to control the second pixel unit in the second LCD to show the calibration colors corresponding to the calibration three stimulus values. Accordingly, the consistency calibration process of the color display for different LCDs is accomplished, and thus, to make the display result of the second LCD and the display result of the first LCD come close to the same.

12 Claims, 2 Drawing Sheets

(51) Int. Cl.
*G09G 3/34* (2006.01)
*G09G 3/36* (2006.01)

(56) References Cited

U.S. PATENT DOCUMENTS

| | | | | |
|---|---|---|---|---|
| 6,340,976 B1* | 1/2002 | Oguchi | ............... | H04N 9/3147 345/22 |
| 9,799,251 B2* | 10/2017 | Cho | ..................... | G09G 3/20 |
| 2002/0000968 A1 | 1/2002 | Yanagi | | |
| 2003/0156073 A1* | 8/2003 | Van Zon | ............... | G06F 3/1446 345/1.1 |
| 2012/0014593 A1* | 1/2012 | Jaynes | ............... | H04N 1/6055 382/165 |
| 2014/0292616 A1* | 10/2014 | Fear | .................... | G06F 3/1423 345/1.1 |

FOREIGN PATENT DOCUMENTS

| | | |
|---|---|---|
| CN | 103314405 A | 9/2013 |
| CN | 103354087 A | 10/2013 |
| CN | 103489402 A | 1/2014 |
| JP | 2011254350 A | 12/2011 |
| WO | 2011092944 A1 | 8/2011 |

\* cited by examiner

METHOD AND SYSTEM OF SHOWING COLORS FOR MOSAIC DISPLAY DEVICE

CROSS REFERENCE

This application claims the priority of Chinese Patent Application No. 201610069439.9, entitled "Method and system of showing colors for mosaic display device", filed on Feb. 1, 2016, the disclosure of which is incorporated herein by reference in its entirety.

FIELD OF THE INVENTION

The present invention relates to an electronic display technology field, and more particularly to a method and a system of showing colors for a mosaic display device.

BACKGROUND OF THE INVENTION

Because the advantages of energy conservation and environment protection, portability, the LCD (Liquid Crystal Display) has been widely applied and promoted. As being an advertising board for the exhibition, several LCDs are often in mosaic exhibit for playing the same pictures or videos. However, with the chroma difference or the LCD manufacture process difference of the backlight module in the LCD, the same color may have the different display results in the different LCDs, and influences the exhibition result.

SUMMARY OF THE INVENTION

On this account, the technical issue to be solved by the embodiment of the present invention is to provide a method and a system of showing colors for a mosaic display device, which can make the display results of the showing the same color by the different LCDs which are in mosaic exhibit are almost the same.

A method of showing colors for a mosaic display device, and the mosaic display device comprises a first liquid crystal display and a second liquid crystal display, and the first liquid crystal display comprises a first pixel unit, and the second liquid crystal display comprises a second pixel unit corresponding to the first pixel unit, wherein the method comprises: obtaining original three stimulus values of original colors of the first group shown by the first pixel unit; sending a reference control signal to the first liquid crystal display, and the reference control signal is employed to control the first pixel unit to show a reference color corresponding thereto; determining reference three stimulus values of the reference color according to the original three stimulus values of the original colors of the first group; obtaining original three stimulus values of original colors of the second group shown by the second pixel unit; determining all shown three stimulus values of the colors shown by the second pixel unit according to the original three stimulus values of the original colors of the second group; determining calibration three stimulus values of the second pixel unit according to the reference three stimulus values and the all shown three stimulus values, wherein the calibration three stimulus values are shown three stimulus values in the all shown three stimulus values, of which a difference value with the reference three stimulus values is the smallest; determining calibration colors corresponded with the reference three stimulus values; sending a reference control signal to the second liquid crystal display, and the reference control signal is employed to control the second pixel unit to show the calibration colors.

The step of determining reference three stimulus values of the reference color according to the original three stimulus values of the original colors of the first group comprises: querying first original three stimulus values, second original three stimulus values and third original three stimulus values in the original three stimulus values of the original colors of the first group, and the first original three stimulus values are three stimulus values of the first original color in the original colors of the first group, and the second original three stimulus values are three stimulus values of the second original color in the original colors of the first group, and the third original three stimulus values are three stimulus values of the third original color in the original colors of the first group, and the first original color has the same R component gray value r of the reference color, and the second original color has the same G component gray value g of the reference color, and the third original color has the same B component gray value b of the reference color; according to the first original three stimulus values, the second original three stimulus values and the third original three stimulus values, the reference three stimulus values are calculated with the formula (1):

$$\begin{bmatrix} X_c \\ Y_c \\ Z_c \end{bmatrix} = \begin{bmatrix} X_r \\ Y_r \\ Z_r \end{bmatrix} + \begin{bmatrix} X_g \\ Y_g \\ Z_g \end{bmatrix} + \begin{bmatrix} X_b \\ Y_b \\ Z_b \end{bmatrix} \quad (1)$$

$(X_c, Y_c, Z_c)$ are the reference three stimulus values, $(X_r, Y_r, Z_r)$ are the first original three stimulus values, $(X_g, Y_g, Z_g)$ are the second three stimulus values, $(X_b, Y_b, Z_b)$ are the third three stimulus values.

The step of determining all shown three stimulus values of the colors shown by the second pixel unit according to the original three stimulus values of the original colors of the second group comprises: querying fourth original three stimulus values, fifth original three stimulus values and sixth original three stimulus values in the original three stimulus values of the original colors of the second group, and the fourth original three stimulus values are three stimulus values of the fourth original color in the original colors of the second group, and the fifth original three stimulus values are three stimulus values of the fifth original color in the original colors of the second group, and the sixth original three stimulus values are three stimulus values of the sixth original color in the original colors of the second group, and the fourth original color has the same R component gray value i of the mth color in the colors shown by the second pixel unit, and the fifth original color has the same G component gray value j of the mth color in the colors shown by the second pixel unit, and the sixth original color has the same B component gray value k of the mth color in the colors shown by the second pixel unit, m=1, 2, 3, . . . $256^3$, i=0, 1, 2, . . . 255, j=0, 1, 2, . . . 255, k=0, 1, 2, . . . 255; according to the fourth original three stimulus values, the fifth original three stimulus values and the sixth original three stimulus values, the all shown three stimulus values are calculated with the formula (2):

$$\begin{bmatrix} X_m \\ Y_m \\ Z_m \end{bmatrix} = \begin{bmatrix} X_i \\ Y_i \\ Z_i \end{bmatrix} + \begin{bmatrix} X_j \\ Y_j \\ Z_j \end{bmatrix} + \begin{bmatrix} X_k \\ Y_k \\ Z_k \end{bmatrix} \quad (2)$$

$(X_m, Y_m, Z_m)$ are the mth shown three stimulus values in the all shown three stimulus values, and the mth shown three stimulus values are three stimulus values of the mth RGB colors, and $(X_i, Y_i, Z_i)$ are the fourth original three stimulus values, and $(X_j, Y_j, Z_j)$ are the fifth original three stimulus values, and $(X_k, Y_k, Z_k)$ are the sixth original three stimulus values.

The step of determining calibration three stimulus values of the second pixel unit according to the reference three stimulus values and the all shown three stimulus values comprises: calculating the calibration three stimulus values according to the reference three stimulus values and the all shown three stimulus values, and the calibration three stimulus values are shown three stimulus values in the all shown three stimulus values, which makes a result of the formula (3) to be the smallest.

$$(X_m-X_c)^2+(Y_m-Y_c)^2+(Z_m-Z_c)^2, \; m=1,2,3,\ldots 256^3 \qquad (3)$$

The step of obtaining original three stimulus values of original colors of the first group shown by the first pixel unit comprises: sending an original control signal to the first liquid crystal display, and the original control signal is employed to control the first pixel unit to show the original colors of the first group; measuring the original three stimulus values of the original colors of the first group.

The step of obtaining original three stimulus values of original colors of the first group shown by the first pixel unit comprises: sending an original control signal to the second liquid crystal display, and the original control signal is employed to control the second pixel unit to show the original colors of the second group; obtaining original three stimulus values of original colors of the second group.

A system of showing colors for a mosaic display device, and the mosaic display device comprises a first liquid crystal display and a second liquid crystal display, and the first liquid crystal display comprises a first pixel unit, and the second liquid crystal display comprises a second pixel unit corresponding to the first pixel unit, wherein the system comprises: an obtaining module, employed for obtaining original three stimulus values of original colors of the first group shown by the first pixel unit; a sending module, employed for sending a reference control signal to the first liquid crystal display, and the reference control signal is employed to control the first pixel unit to show a reference color corresponding thereto; a determining module, employed for determining reference three stimulus values of the reference color obtained by the obtaining module according to the original three stimulus values of the original colors of the first group; the obtaining module is further employed for obtaining original three stimulus values of original colors of the second group shown by the second pixel unit; the determining module is further employed for determining all shown three stimulus values of the colors shown by the second pixel unit according to the original three stimulus values of the original colors of the second group obtained by the obtaining module; the determining module is further employed for determining calibration three stimulus values of the second pixel unit according to the reference three stimulus values and the all shown three stimulus values, wherein the calibration three stimulus values are shown three stimulus values in the all shown three stimulus values, of which a difference value with the reference three stimulus values is the smallest; the determining module is further employed for determining calibration colors corresponded with the reference three stimulus values; the sending module is further employed for sending a reference control signal to the second liquid crystal display, and the reference control signal is employed to control the second pixel unit to show the calibration colors.

The determining module further comprises: a querying unit, employed for querying first original three stimulus values, second original three stimulus values and third original three stimulus values in the original three stimulus values of the original colors of the first group obtained by the obtaining module, and the first original three stimulus values are three stimulus values of the first original color in the original colors of the first group, and the second original three stimulus values are three stimulus values of the second original color in the original colors of the first group, and the third original three stimulus values are three stimulus values of the third original color in the original colors of the first group, and the first original color has the same R component gray value r of the reference color, and the second original color has the same G component gray value g of the reference color, and the third original color has the same B component gray value b of the reference color; a calculation unit, in which according to the first original three stimulus values, the second original three stimulus values and the third original three stimulus values queried by the querying unit, the reference three stimulus values are calculated with the formula (1):

$$\begin{bmatrix} X_c \\ Y_c \\ Z_c \end{bmatrix} = \begin{bmatrix} X_r \\ Y_r \\ Z_r \end{bmatrix} + \begin{bmatrix} X_g \\ Y_g \\ Z_g \end{bmatrix} + \begin{bmatrix} X_b \\ Y_b \\ Z_b \end{bmatrix} \qquad (1)$$

$(X_c, Y_c, Z_c)$ are the reference three stimulus values, $(X_r, Y_r, Z_r)$ are the first original three stimulus values, $(X_g, Y_g, Z_g)$ are the second three stimulus values, $(X_b, Y_b, Z_b)$ are the third three stimulus values.

The querying unit is further employed for querying fourth original three stimulus values, fifth original three stimulus values and sixth original three stimulus values in the original three stimulus values of the original colors of the second group obtained by the obtaining module, and the fourth original three stimulus values are three stimulus values of the fourth original color in the original colors of the second group, and the fifth original three stimulus values are three stimulus values of the fifth original color in the original colors of the second group, and the sixth original three stimulus values are three stimulus values of the sixth original color in the original colors of the second group, and the fourth original color has the same R component gray value i of the mth color in the colors shown by the second pixel unit, and the fifth original color has the same G component gray value j of the mth color in the colors shown by the second pixel unit, and the sixth original color has the same B component gray value k of the mth color in the colors shown by the second pixel unit, m=1, 2, 3, . . . $256^3$, i=0, 1, 2, . . . 255, j=0, 1, 2, . . . 255, k=0, 1, 2, . . . 255; the calculation unit is further employed for that according to the fourth original three stimulus values, the fifth original three stimulus values and the sixth original three stimulus values queried by the querying module, the all shown three stimulus values are calculated with the formula (2):

$$\begin{bmatrix} X_m \\ Y_m \\ Z_m \end{bmatrix} = \begin{bmatrix} X_i \\ Y_i \\ Z_i \end{bmatrix} + \begin{bmatrix} X_j \\ Y_j \\ Z_j \end{bmatrix} + \begin{bmatrix} X_k \\ Y_k \\ Z_k \end{bmatrix} \qquad (2)$$

wherein $(X_m, Y_m, Z_m)$ are the mth shown three stimulus values in the all shown three stimulus values, and the mth shown three stimulus values are three stimulus values of the mth RGB colors, and $(X_i, Y_i, Z_i)$ are the fourth original three stimulus values, and $(X_j, Y_j, Z_j)$ are the fifth original three stimulus values, and $(X_k, Y_k, Z_k)$ are the sixth original three stimulus values.

The calculating unit is further employed for calculating the calibration three stimulus values according to the reference three stimulus values and the all shown three stimulus values, and the calibration three stimulus values are shown three stimulus values in the all shown three stimulus values, which makes a result of the formula (3) to be the smallest.

$$(X_m-X_c)^2+(Y_m-Y_c)^2+(Z_m-Z_c)^2, m=1,2,3,\ldots 256^3 \quad (3)$$

The sending module is further employed for sending the original control signal to the first liquid crystal display and the second liquid crystal display, and the original control signal is employed to control the first pixel unit to show the original colors of the first group; the obtaining module is employed for measuring the original three stimulus values of the original colors of the first group, and for measuring the original three stimulus values of the original colors.

The sending module is further employed for obtaining original three stimulus values of original colors of the first group shown by the first pixel unit comprises: sending an original control signal to the second liquid crystal display, and the original control signal is employed to control the second pixel unit to show the original colors of the second group; the obtaining module is specifically employed for obtaining original three stimulus values of original colors of the second group.

Therefore, the embodiment of the present invention provides the method and the system of showing colors for a mosaic display device, comprising steps of sending the reference control signal to the first LCD to control the first pixel unit in the first LCD to show the reference colors; determining the reference three stimulus values of the reference colors; determining the calibration three stimulus values closest to the reference three stimulus values; and then sending the calibration control signal to the second LCD to control the second pixel unit in the second LCD to show the calibration colors corresponding to the calibration three stimulus values. Accordingly, the consistency calibration process of the color display for different LCDs is accomplished, and thus, to make the display result of the second LCD and the display result of the first LCD come close to the same.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

In this embodiment, the mosaic display device comprises a first LCD and a second LCD. The first LCD and the second LCD have the same sizes or different sizes. The first LCD and the second LCD show the same image at the same moment. The first LCD comprises a first pixel unit, and the second LCD comprises a second pixel unit. The first pixel unit and the second pixel unit should show the color result of the specific position in the same image at the same time. It should be understood that in this embodiment, it is illustrated that the mosaic display device comprises two LCDs, one pixel unit in the first pixel unit and one pixel unit in the second pixel unit respectively are research objects for description. However, actually, the solution of the present invention is generally applied to the consistency calibration process of the color display for more than two LCDs, and more corresponding pixels in the more than two LCDs.

Figure 1:
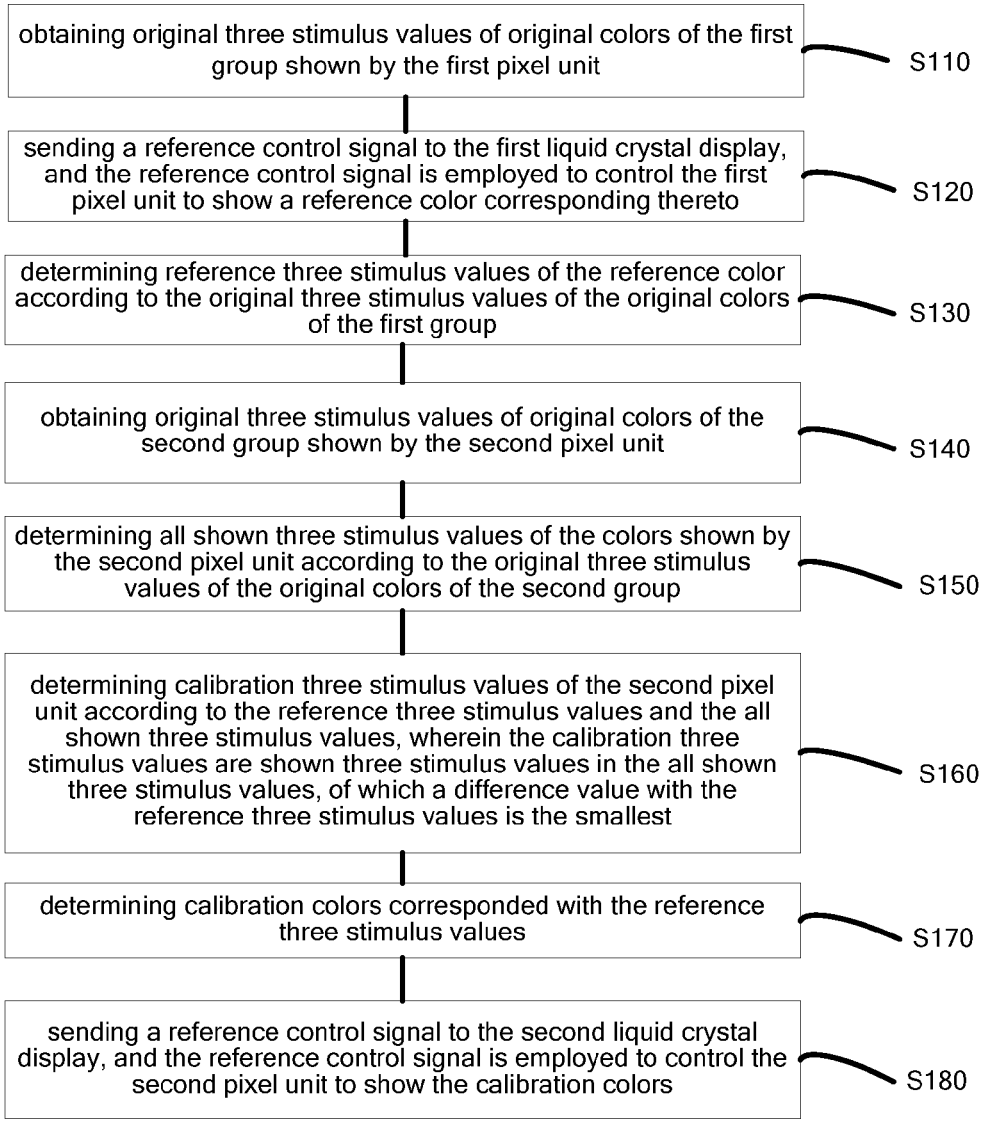
FIG. 1 is a schematic flow chart of a method of showing colors for a mosaic display device provided by the embodiment of the present invention.

FIG. 1 shows a schematic flow chart of a method 100 of showing colors for a mosaic display device provided by the embodiment of the present invention. As shown in FIG. 1, the method 100 comprises:

S110, obtaining original three stimulus values of original colors of the first group shown by the first pixel unit;

S120, sending a reference control signal to the first liquid crystal display, and the reference control signal is employed to control the first pixel unit to show a reference color corresponding thereto;

S130, determining reference three stimulus values of the reference color according to the original three stimulus values of the original colors of the first group;

S140, obtaining original three stimulus values of original colors of the second group shown by the second pixel unit;

S150, determining all shown three stimulus values of the colors shown by the second pixel unit according to the original three stimulus values of the original colors of the second group;

S160, determining calibration three stimulus values of the second pixel unit according to the reference three stimulus values and the all shown three stimulus values, wherein the calibration three stimulus values are shown three stimulus values in the all shown three stimulus values, of which a difference value with the reference three stimulus values is the smallest;

S170, determining calibration colors corresponded with the reference three stimulus values;

S180, sending a reference control signal to the second liquid crystal display, and the reference control signal is employed to control the second pixel unit to show the calibration colors.

Due to the factors of process differences, the display properties of the first LCD and the second LCD have differences. Therefore, it is necessary to select one LCD to be the display sample for the standard piece so that the color shown on the standard piece also can be shown on the other LCD. In this embodiment, the first LCD is selected to be the reference piece. The judge standard of the standard piece is the brightness or NTSC (National Television Standards Committee) color gamut of the LCD. Specifically, it is determined that whether the brightness of the first LCD is lower than the brightness of the second LCD, and as the brightness of the first LCD is lower than the brightness of the second LCD, the first LCD is selected to be the standard piece. For example, the maximum brightness of the first LCD is 300 nit, and the maximum brightness of the second LCD is 500 nit, and the first LCD is determined to be the standard piece. Then, both the first LCD and the second LCD can show the image of which the brightness is the 300 nit. Or, it is determined that whether the NTSC color gamut of the first LCD is lower than the NTSC color gamut of the second LCD, and as the NTSC color gamut of the first LCD is lower than the NTSC color gamut of the second LCD, the first LCD is selected to be the standard piece. In other embodiments, the mosaic display device can further comprises more LCDs, and similarly, one standard piece needs to be determined in advance.

Specifically, the first pixel unit in the first LCD shows original colors of the first group. The original colors of the first group are constructed with all pure red of 0-225 gray scales, all pure green of 0-225 gray scales and all pure blue of 0-225 gray scales, which are 768 colors in total. Some color shown on the single pixel unit on the LCD has a corresponding relationship with the three stimulus values of this color, and the three stimulus values corresponding to this color can be obtained with measurement and/or calculation. Thus, in S110, the original three stimulus values of original colors of the first group shown by the first pixel unit can be obtained.

Furthermore, in the method 100 in this embodiment, S110 comprises:

sending an original control signal to the first liquid crystal display, and the original control signal is employed to control the first pixel unit to show the original colors of the first group;

measuring the original three stimulus values of the original colors of the first group.

Specifically, the step comprises sending an original control signal to the first liquid crystal display, and the original control signal is employed to control the first pixel unit to show the original colors of the first group. The first pixel unit shows the original colors of the first group under drive of the specific program after receiving the original control signal.

With the color analyzer, such as CS2000/CA310, the original three stimulus values of every color in the original colors of the first group are measured. In other embodiments, other instruments also can be employed to measure the three stimulus values.

In S120, the step comprises sending a reference control signal to the first liquid crystal display, and the reference control signal is employed to control the first pixel unit to show a reference color corresponding thereto. The first pixel unit shows the reference color after receiving the reference control signal. The reference color comprises arbitrary R, G and B component gray scales. Then, in S130, the step comprises determining reference three stimulus values of the reference color according to the original three stimulus values of the original colors of the first group.

Furthermore, in the method 100 in this embodiment, S130 comprises:

querying first original three stimulus values, second original three stimulus values and third original three stimulus values in the original three stimulus values of the original colors of the first group, and the first original three stimulus values are three stimulus values of the first original color in the original colors of the first group, and the second original three stimulus values are three stimulus values of the second original color in the original colors of the first group, and the third original three stimulus values are three stimulus values of the third original color in the original colors of the first group, and the first original color has the same R component gray value r of the reference color, and the second original color has the same G component gray value g of the reference color, and the third original color has the same B component gray value b of the reference color;

according to the first original three stimulus values, the second original three stimulus values and the third original three stimulus values, the reference three stimulus values are calculated with the formula (1):

$$\begin{bmatrix} X_c \\ Y_c \\ Z_c \end{bmatrix} = \begin{bmatrix} X_r \\ Y_r \\ Z_r \end{bmatrix} + \begin{bmatrix} X_g \\ Y_g \\ Z_g \end{bmatrix} + \begin{bmatrix} X_b \\ Y_b \\ Z_b \end{bmatrix} \quad (1)$$

wherein $(X_c, Y_c, Z_c)$ are the reference three stimulus values, $(X_r, Y_r, Z_r)$ are the first original three stimulus values, $(X_g, Y_g, Z_g)$ are the second three stimulus values, $(X_b, Y_b, Z_b)$ are the third three stimulus values.

Specifically, the original colors of the first group shown by the first pixel unit comprises the first original color, the second original color and the third original color; the original three stimulus values of the original colors of the first group obtained by measurement comprises the first original three stimulus values, the second original three stimulus values and the third original three stimulus values. Therefore, the first original color, the second original color and the third original color can be determined according to the reference colors; then, the first original three stimulus values, and the second original three stimulus values and the third original three stimulus values, which respectively correspond to the first original color, the second original color and the third original color, are queried and obtained according to the corresponding relationships of the colors and the three stimulus values, and the first original three stimulus values, the second original three stimulus values and the third original three stimulus values, which are queried, are substituted into the formula (1) to calculate the reference three stimulus values.

The second pixel unit in the second LCD shows the original colors of the second group. The original colors of the second group are similarly constructed with all pure red of 0-225 gray scales, all pure green of 0-225 gray scales and all pure blue of 0-225 gray scales, which are 768 colors in total. Similarly as described in S110, in S140, the original three stimulus values of the original colors of the second group shown by the second pixel unit can be obtained with measurement and/or calculation.

Furthermore, in the method 100 in this embodiment, S140 comprises:

sending an original control signal to the second liquid crystal display, and the original control signal is employed to control the second pixel unit to show the original colors of the second group;

obtaining original three stimulus values of original colors of the second group.

Specifically, the step comprises sending an original control signal to the second liquid crystal display, and the original control signal is employed to control the second pixel unit to show the original colors of the second group. The second pixel unit shows the original colors of the second group under drive of the specific program after receiving the original control signal.

Similarly, with the color analyzer, such as CS2000/CA310, the original three stimulus values of every color in the original colors of the first group are measured. In other embodiments, other instruments also can be employed to measure the three stimulus values.

In the method 100 of this embodiment, the color shown by the second pixel unit is the color comprising arbitrary R, G and B component gray scales, and the $256^3$ colors shown by the second pixel unit are in total. In S150, the step comprises determining all shown three stimulus values of the colors shown by the second pixel unit according to the original three stimulus values of the original colors of the second group.

Furthermore, in the method 100 in this embodiment, S150 comprises:

querying fourth original three stimulus values, fifth original three stimulus values and sixth original three stimulus values in the original three stimulus values of the original colors of the second group, and the fourth original three stimulus values are three stimulus values of the fourth original color in the original colors of the second group, and the fifth original three stimulus values are three stimulus values of the fifth original color in the original colors of the second group, and the sixth original three stimulus values are three stimulus values of the sixth original color in the original colors of the second group, and the fourth original color has the same R component gray value i of the mth color in the colors shown by the second pixel unit, and the fifth original color has the same G component gray value j of the mth color in the colors shown by the second pixel unit, and the sixth original color has the same B component gray value k of the mth color in the colors shown by the second pixel unit, m=1, 2, 3, . . . $256^3$, i=0, 1, 2, . . . 255, j=0, 1, 2, . . . 255, k=0, 1, 2, . . . 255;

according to the fourth original three stimulus values, the fifth original three stimulus values and the sixth original three stimulus values, the all shown three stimulus values are calculated with the formula (2):

$$\begin{bmatrix} X_m \\ Y_m \\ Z_m \end{bmatrix} = \begin{bmatrix} X_i \\ Y_i \\ Z_i \end{bmatrix} + \begin{bmatrix} X_j \\ Y_j \\ Z_j \end{bmatrix} + \begin{bmatrix} X_k \\ Y_k \\ Z_k \end{bmatrix} \quad (2)$$

wherein $(X_m, Y_m, Z_m)$ are the mth shown three stimulus values in the all shown three stimulus values, and the mth shown three stimulus values are three stimulus values of the mth RGB colors, and $(X_i, Y_i, Z_i)$ are the fourth original three stimulus values, and $(X_j, Y_j, Z_j)$ are the fifth original three stimulus values, and $(X_k, Y_k, Z_k)$ are the sixth original three stimulus values.

Specifically, the original colors of the second group shown by the second pixel unit comprises the fourth original color, the fifth original color and the sixth original color; the original three stimulus values of the original colors of the second group obtained by measurement comprises the fourth original three stimulus values, the fifth original three stimulus values and the third original three stimulus values. Therefore, the fourth original color, the fifth original color and the sixth original color can be determined according to the mth colors; then, the fourth original three stimulus values, and the fifth original three stimulus values and the sixth original three stimulus values, which respectively correspond to the fourth original color, the fifth original color and the sixth original color, are queried and obtained according to the corresponding relationships of the colors and the three stimulus values. The fourth original three stimulus values, the fifth original three stimulus values and the sixth original three stimulus values, which are queried and obtained, are substituted into the formula (2) to calculate the mth shown three stimulus values. $256^3$ calculations are performed according to the formula (2), and ultimately, the all shown three stimulus values can be obtained.

In the method 100 of this embodiment, the calibration three stimulus values reflect the display result of the second pixel unit after the color display is calibrated. Thus, for making the display result of the second pixel unit and the display result of the first pixel unit come close to the same, the calibration three stimulus values should be the same with or closest to the reference three stimulus values. The calibration three stimulus values are shown three stimulus values in the all shown three stimulus values. In S160, the shown three stimulus values are determined from the all shown three stimulus values, which make the difference from the reference three stimulus values the smallest.

Furthermore, in the method 100 in this embodiment, S160 comprises:

calculating the calibration three stimulus values according to the reference three stimulus values and the all shown three stimulus values, and the calibration three stimulus values are shown three stimulus values in the all shown three stimulus values, which makes a result of the formula (3) to be the smallest.

$$(X_m-X_c)^2+(Y_m-Y_c)^2+(Z_m-Z_c)^2, \ m=1,2,3, \ldots 256^3 \quad (3)$$

Specifically, the $256^3$ shown three stimulus values in total in the all shown three stimulus values are sequentially substituted into the formula (3) for calculation, and then the minimum value is acquired for all the calculation results, the shown three stimulus values corresponding to the minimum value are the calibration three stimulus values.

In the method 100 of this embodiment, as the original three stimulus values are obtained in S140, the corresponding relationships between the original colors of the second group and the original three stimulus values of the original colors of the second group are also recorded at the same time; in S150, as determining the all shown three stimulus values, the corresponding relationships among the mth shown three stimulus values and the fourth original three stimulus values, the fifth original three stimulus values and the sixth original three stimulus values are also recorded. Thus, as calculating and obtaining the calibration three stimulus values in S160, the three original three stimulus values corresponding to the calibration three stimulus values can be obtained at the same time. Moreover, the three original colors in the original colors in the second group corresponding to theses the three original three stimulus values can be queried. These three original three stimulus values respectively have the R component gray scale, the G component gray scale and the B component gray scale, which are the same as the calibration color. Accordingly, in S170, ultimately, the calibration color can be determined. Then, in S180, the calibration control signal is sent to the second LCD, and the second LCD receives the calibration control signal, and the second pixel unit shows the calibration color.

It should be understood that in the method 100 of the embodiment according to the present invention, only the first pixel unit and the second pixel unit are research objects for description. Practically, the method 100 can be employed for performing the consistency calibration process of the color display for many corresponding pixel units on the first LCD and the second LCD at the same time.

Therefore, the embodiment of the present invention provides the method 100 of showing colors for a mosaic display device, comprising steps of sending the reference control signal to the first LCD, which is employed to be the standard piece to control the first pixel unit in the first LCD to show the reference colors; determining the reference three stimulus values of the reference colors; determining the calibration three stimulus values closest to the reference three stimulus values; and then sending the calibration control signal to the second LCD to control the second pixel unit in the second LCD to show the calibration colors corresponding to the calibration three stimulus values. Accordingly, the consistency calibration process of the color display for different LCDs is accomplished, and thus, to make the display result of the second LCD and the display result of the first LCD come close to the same.

In the embodiment of the aforesaid method according to the present invention, the numbers of the respective steps do not represent the execution order. The execution order of the respective steps should be determined according the function and the internal logic but should not construct any restriction to the implementation of the embodiment of the present invention.

The aforesaid description with combination of FIG. 1, the method of showing colors for a mosaic display device in the embodiment of the present invention is described in detail. With combination of FIG. 2 and FIG. 3, a system of showing colors for a mosaic display device in the embodiment of the present invention is described.

Figure 2:
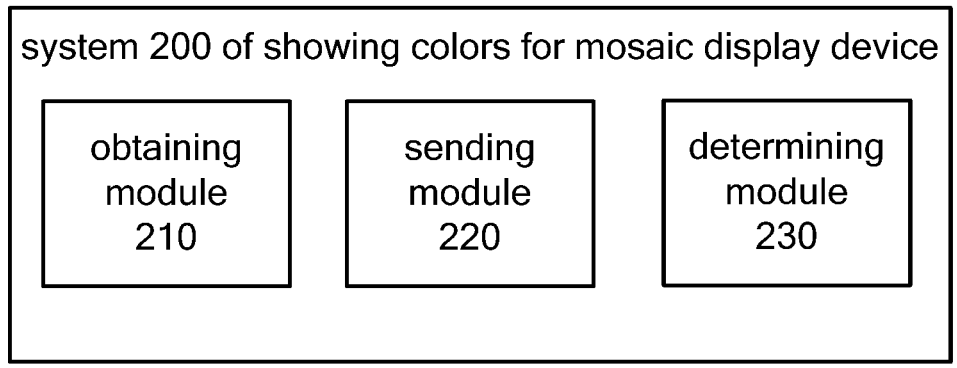
FIG. 2 is a schematic structure diagram of a system of showing colors for a mosaic display device provided by the embodiment of the present invention.

As shown in FIG. 2, a system 200 of showing colors for a mosaic display device in the embodiment of the present invention comprises an obtaining module 210, a sending module 220 and a determining module 230.

The obtaining module 210 is employed for obtaining original three stimulus values of original colors of the first group shown by the first pixel unit; the sending module 220 is employed for sending a reference control signal to the first liquid crystal display, and the reference control signal is employed to control the first pixel unit to show a reference color corresponding thereto; the determining module 230 is employed for determining reference three stimulus values of the reference color obtained by the obtaining module 210 according to the original three stimulus values of the original colors of the first group.

The obtaining module 210 is further employed for obtaining original three stimulus values of original colors of the second group shown by the second pixel unit; the determining module 230 is further employed for determining all shown three stimulus values of the colors shown by the second pixel unit according to the original three stimulus values of the original colors of the second group obtained by the obtaining module 210.

The determining module 230 is further employed for determining calibration three stimulus values of the second pixel unit according to the reference three stimulus values and the all shown three stimulus values, wherein the calibration three stimulus values are shown three stimulus values in the all shown three stimulus values, of which a difference value with the reference three stimulus values is the smallest.

The determining module 230 is further employed for determining calibration colors corresponded with the reference three stimulus values. The sending module 220 is further employed for sending a reference control signal to the second liquid crystal display, and the reference control signal is employed to control the second pixel unit to show the calibration colors.

Furthermore, the sending module 220 is further employed for sending an original control signal to the first liquid crystal display, and the original control signal is employed to control the first pixel unit to show the original colors of the first group. Correspondingly, the obtaining module 210 is employed for obtaining original three stimulus values of original colors of the first group shown by the first pixel unit.

Furthermore, the sending module 220 is further employed for sending an original control signal to the second liquid crystal display, and the original control signal is employed to control the second pixel unit to show the original colors of the second group. Correspondingly, the obtaining module 210 is further employed for obtaining original three stimulus values of original colors of the second group shown by the second pixel unit.

Figure 3:
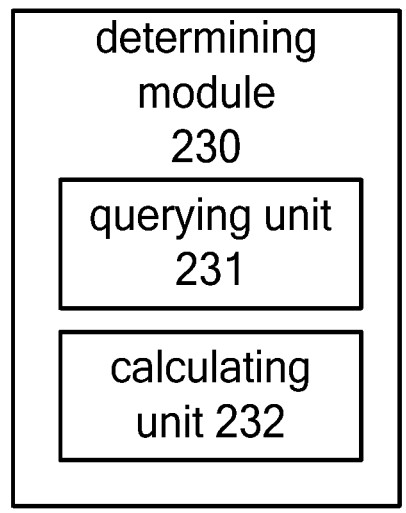
FIG. 3 is a schematic structure diagram of a determining module shown in FIG. 2.

Furthermore, as shown in FIG. 3, the determining module 230 further comprises a querying unit 231 and a calculating unit 232.

The querying unit 231 is employed for querying first original three stimulus values, second original three stimulus values and third original three stimulus values in the original three stimulus values of the original colors of the first group obtained by the obtaining module 210, and the first original three stimulus values are three stimulus values of the first original color in the original colors of the first group, and the second original three stimulus values are three stimulus values of the second original color in the original colors of the first group, and the third original three stimulus values are three stimulus values of the third original color in the original colors of the first group, and the first original color has the same R component gray value r of the reference color, and the second original color has the same G component gray value g of the reference color, and the third original color has the same B component gray value b of the reference color.

The calculation unit 232, in which according to the first original three stimulus values, the second original three stimulus values and the third original three stimulus values queried by the querying unit 231, the reference three stimulus values are calculated with the formula (1):

$$\begin{bmatrix} X_c \\ Y_c \\ Z_c \end{bmatrix} = \begin{bmatrix} X_r \\ Y_r \\ Z_r \end{bmatrix} + \begin{bmatrix} X_g \\ Y_g \\ Z_g \end{bmatrix} + \begin{bmatrix} X_b \\ Y_b \\ Z_b \end{bmatrix} \quad (1)$$

$(X_c, Y_c, Z_c)$ are the reference three stimulus values, $(X_r, Y_r, Z_r)$ are the first original three stimulus values, $(X_g, Y_g, Z_g)$ are the second three stimulus values, $(X_b, Y_b, Z_b)$ are the third three stimulus values.

Furthermore, the querying unit 231 is further employed for querying fourth original three stimulus values, fifth original three stimulus values and sixth original three stimulus values in the original three stimulus values of the original colors of the second group obtained by the obtaining module 210, and the fourth original three stimulus values are three stimulus values of the fourth original color in the original colors of the second group, and the fifth original three stimulus values are three stimulus values of the fifth original color in the original colors of the second group, and the sixth original three stimulus values are three stimulus values of the sixth original color in the original colors of the second group, and the fourth original color has the same R component gray value i of the mth color in the colors shown by the second pixel unit, and the fifth original color has the same G component gray value j of the mth color in the colors shown by the second pixel unit, and the sixth original color has the same B component gray value k of the mth color in the colors shown by the second pixel unit, m=1, 2, 3, . . . $256^3$, i=0, 1, 2, . . . 255, j=0, 1, 2, . . . 255, k=0, 1, 2, . . . 255.

The calculation unit 232 is further employed for that according to the fourth original three stimulus values, the fifth original three stimulus values and the sixth original three stimulus values queried by the querying module 231, the all shown three stimulus values are calculated with the formula (2):

$$\begin{bmatrix} X_m \\ Y_m \\ Z_m \end{bmatrix} = \begin{bmatrix} X_i \\ Y_i \\ Z_i \end{bmatrix} + \begin{bmatrix} X_j \\ Y_j \\ Z_j \end{bmatrix} + \begin{bmatrix} X_k \\ Y_k \\ Z_k \end{bmatrix} \quad (2)$$

$(X_m, Y_m, Z_m)$ are the mth shown three stimulus values in the all shown three stimulus values, and the mth shown three stimulus values are three stimulus values of the mth RGB colors, and $(X_i, Y_i, Z_i)$ are the fourth original three stimulus values, and $(X_j, Y_j, Z_j)$ are the fifth original three stimulus values, and $(X_k, Y_k, Z_k)$ are the sixth original three stimulus values.

Moreover, the calculating unit 232 is further employed for calculating the calibration three stimulus values according to the reference three stimulus values and the all shown three stimulus values, and the calibration three stimulus values are shown three stimulus values in the all shown three stimulus values, which makes a result of the formula (3) to be the smallest.

$$(X_m-X_c)^2+(Y_m-Y_c)^2+(Z_m-Z_c)^2, \; m=1,2,3,\ldots 256^3 \quad (3)$$

It should be understood that in the system 200 of the embodiment according to the present invention, only the first pixel unit and the second pixel unit are research objects for description. Practically, the system 200 can be employed for performing the consistency calibration process of the color display for many corresponding pixel units on the first LCD and the second LCD at the same time.

Therefore, the embodiment of the present invention provides the system 200 of showing colors for a mosaic display device, comprising steps of sending the reference control signal to the first LCD, which is employed to be the standard piece to control the first pixel unit in the first LCD to show the reference colors; determining the reference three stimulus values of the reference colors; determining the calibration three stimulus values closest to the reference three stimulus values; and then sending the calibration control signal to the second LCD to control the second pixel unit in the second LCD to show the calibration colors corresponding to the calibration three stimulus values. Accordingly, the consistency calibration process of the color display for different LCDs is accomplished, and thus, to make the display result of the second LCD and the display result of the first LCD come close to the same.

Those skilled persons in this art can understand that for the convenience and simplicity of the description, the specific working process of the system, device and unit described in the embodiment of the aforesaid device can refer to the corresponding process in the embodiment of the aforesaid method, and the repeated description is omitted here.

The foregoing descriptions are merely the specific embodiments of the present invention. However, the present invention is not limited thereby. Any modifications, equivalent replacements or improvements within the spirit and principles of the embodiment described above, which can be easily derived by those skilled persons in this art from the technical field disclosed in the present invention should be covered by the protected scope of the invention. Thus, the patent protection scope of the present invention should be subjected to what is claimed is.

What is claimed is:

1. A method of showing colors for a mosaic display device, and the mosaic display device comprises a first liquid crystal display and a second liquid crystal display, and the first liquid crystal display comprises a first pixel unit, and the second liquid crystal display comprises a second pixel unit corresponding to the first pixel unit, wherein the method comprises:

obtaining original three stimulus values of original colors of a first group shown by the first pixel unit;

sending a reference control signal to the first liquid crystal display, and the reference control signal is employed to control the first pixel unit to show a reference color corresponding thereto;

determining reference three stimulus values of the reference color according to the original three stimulus values of the original colors of the first group;

obtaining original three stimulus values of original colors of a second group shown by the second pixel unit;

determining all shown three stimulus values of the colors shown by the second pixel unit according to the original three stimulus values of the original colors of the second group;

determining calibration three stimulus values of the second pixel unit according to the reference three stimulus values and the all shown three stimulus values, wherein the calibration three stimulus values are shown three stimulus values in the all shown three stimulus values, of which a difference value with the reference three stimulus values is the smallest;

determining calibration colors corresponded with the reference three stimulus values;

sending a reference control signal to the second liquid crystal display, and the reference control signal is employed to control the second pixel unit to show the calibration colors.

2. The method according to claim 1, wherein the step of determining reference three stimulus values of the reference color according to the original three stimulus values of the original colors of the first group comprises:

querying first original three stimulus values, second original three stimulus values and third original three stimulus values in the original three stimulus values of the original colors of the first group, and the first original three stimulus values are three stimulus values of the first original color in the original colors of the first group, and the second original three stimulus values are three stimulus values of the second original color in the original colors of the first group, and the third original three stimulus values are three stimulus values of the third original color in the original colors of the first group, and the first original color has the same R component gray value r of the reference color, and the second original color has the same G component gray value g of the reference color, and the third original color has the same B component gray value b of the reference color;

according to the first original three stimulus values, the second original three stimulus values and the third original three stimulus values, the reference three stimulus values are calculated with the formula (1):

$$\begin{bmatrix} X_c \\ Y_c \\ Z_c \end{bmatrix} = \begin{bmatrix} X_r \\ Y_r \\ Z_r \end{bmatrix} + \begin{bmatrix} X_g \\ Y_g \\ Z_g \end{bmatrix} + \begin{bmatrix} X_b \\ Y_b \\ Z_b \end{bmatrix} \quad (1)$$

$(X_c, Y_c, Z_c)$ are the reference three stimulus values, $(X_r, Y_r, Z_r)$ are the first original three stimulus values, $(X_g, Y_g, Z_g)$ are the second three stimulus values, $(X_b, Y_b, Z_b)$ are the third three stimulus values.

3. The method according to claim 2, wherein the step of determining all shown three stimulus values of the colors shown by the second pixel unit according to the original three stimulus values of the original colors of the second group comprises:

querying fourth original three stimulus values, fifth original three stimulus values and sixth original three stimulus values in the original three stimulus values of the original colors of the second group, and the fourth original three stimulus values are three stimulus values of the fourth original color in the original colors of the second group, and the fifth original three stimulus values are three stimulus values of the fifth original color in the original colors of the second group, and the sixth original three stimulus values are three stimulus values of the sixth original color in the original colors of the second group, and the fourth original color has the same R component gray value i of the mth color in the colors shown by the second pixel unit, and the fifth original color has the same G component gray value j of the mth color in the colors shown by the second pixel unit, and the sixth original color has the same B component gray value k of the mth color in the colors shown by the second pixel unit, $m=1, 2, 3, \ldots 256^3$, $i=0, 1, 2, \ldots 255$, $j=0, 1, 2, \ldots 255$, $k=0, 1, 2, \ldots 255$;

according to the fourth original three stimulus values, the fifth original three stimulus values and the sixth original three stimulus values, the all shown three stimulus values are calculated with the formula (2):

$$\begin{bmatrix} X_m \\ Y_m \\ Z_m \end{bmatrix} = \begin{bmatrix} X_i \\ Y_i \\ Z_i \end{bmatrix} + \begin{bmatrix} X_j \\ Y_j \\ Z_j \end{bmatrix} + \begin{bmatrix} X_k \\ Y_k \\ Z_k \end{bmatrix} \quad (2)$$

$(X_m, Y_m, Z_m)$ are the mth shown three stimulus values in the all shown three stimulus values, and the mth shown three stimulus values are three stimulus values of the mth RGB colors, and $(X_i, Y_i, Z_i)$ are the fourth original three stimulus values, and $(X_j, Y_j, Z_j)$ are the fifth original three stimulus values, and $(X_k, Y_k, Z_k)$ are the sixth original three stimulus values.

4. The method according to claim 3, wherein the step of determining calibration three stimulus values of the second pixel unit according to the reference three stimulus values and the all shown three stimulus values comprises:

calculating the calibration three stimulus values according to the reference three stimulus values and the all shown three stimulus values, and the calibration three stimulus values are shown three stimulus values in the all shown three stimulus values, which makes a result of the formula (3) to be the smallest, $$(X_m - X_c)^2 + (Y_m - Y_c)^2 + (Z_m - Z_c)^2, \quad m=1,2,3, \ldots 256^3 \quad (3).$$

5. The method according to claim 1, wherein the step of obtaining original three stimulus values of original colors of the first group shown by the first pixel unit comprises:

sending an original control signal to the first liquid crystal display, and the original control signal is employed to control the first pixel unit to show the original colors of the first group;

measuring the original three stimulus values of the original colors of the first group.

6. The method according to claim 2, wherein the step of obtaining original three stimulus values of original colors of the first group shown by the first pixel unit comprises:

sending an original control signal to the first liquid crystal display, and the original control signal is employed to control the first pixel unit to show the original colors of the first group;

measuring the original three stimulus values of the original colors of the first group.

7. The method according to claim 3, wherein the step of obtaining original three stimulus values of original colors of the first group shown by the first pixel unit comprises:

sending an original control signal to the first liquid crystal display, and the original control signal is employed to control the first pixel unit to show the original colors of the first group;

measuring the original three stimulus values of the original colors of the first group.

8. The method according to claim 4, wherein the step of obtaining original three stimulus values of original colors of the first group shown by the first pixel unit comprises:

sending an original control signal to the first liquid crystal display, and the original control signal is employed to control the first pixel unit to show the original colors of the first group;

measuring the original three stimulus values of the original colors of the first group.

9. The method according to claim 1, wherein the step of obtaining original three stimulus values of original colors of the first group shown by the first pixel unit comprises:

sending an original control signal to the second liquid crystal display, and the original control signal is employed to control the second pixel unit to show the original colors of the second group;

measuring the original three stimulus values of the original colors of the second group.

10. The method according to claim 2, wherein the step of obtaining original three stimulus values of original colors of the first group shown by the first pixel unit comprises:

sending an original control signal to the second liquid crystal display, and the original control signal is employed to control the second pixel unit to show the original colors of the second group;

measuring the original three stimulus values of the original colors of the second group.

11. The method according to claim 3, wherein the step of obtaining original three stimulus values of original colors of the first group shown by the first pixel unit comprises:
sending an original control signal to the second liquid crystal display, and the original control signal is employed to control the second pixel unit to show the original colors of the second group;
measuring the original three stimulus values of the original colors of the second group.

12. The method according to claim 4, wherein the step of obtaining original three stimulus values of original colors of the first group shown by the first pixel unit comprises:
sending an original control signal to the second liquid crystal display, and the original control signal is employed to control the second pixel unit to show the original colors of the second group;
measuring the original three stimulus values of the original colors of the second group.

\* \* \* \* \*